US010856648B2

(12) United States Patent
Khormaei et al.

(10) Patent No.: US 10,856,648 B2
(45) Date of Patent: Dec. 8, 2020

(54) SYSTEMS AND METHODS FOR MEASURING AND INDICATING BRUSH HEAD LIFE

(71) Applicant: L'Oreal, Paris (FR)

(72) Inventors: Iranpour Khormaei, Vancouver, WA (US); Robert Paul Callaway, Vancouver, WA (US)

(73) Assignee: L'Oreal, Paris (FR)

( * ) Notice: Subject to any disclaimer, the term of this patent is extended or adjusted under 35 U.S.C. 154(b) by 133 days.

(21) Appl. No.: 16/051,368

(22) Filed: Jul. 31, 2018

(65) Prior Publication Data

US 2020/0037747 A1 Feb. 6, 2020

(51) Int. Cl.

| | |
|---|---|
| ***A46B 15/00*** | (2006.01) |
| ***H02N 2/18*** | (2006.01) |
| *H01L 41/113* | (2006.01) |

(52) U.S. Cl.

CPC ........ *A46B 15/001* (2013.01); *A46B 15/0044* (2013.01); *H02N 2/186* (2013.01); *A46B 15/0036* (2013.01); *H01L 41/1136* (2013.01)

(58) Field of Classification Search

CPC .............. A46B 15/001; A46B 15/0036; A46B 15/0044; A46B 2200/102; H02N 2/186

See application file for complete search history.

(56) References Cited

U.S. PATENT DOCUMENTS

| | | | | |
|---|---|---|---|---|
| 6,735,802 | B1 | 5/2004 | Lundell et al. | |
| 2012/0291213 | A1 | 11/2012 | Wu et al. | |
| 2014/0366288 | A1* | 12/2014 | Grez | A46B 15/001 15/22.1 |
| 2016/0286948 | A1* | 10/2016 | Amron | A46B 15/0036 |

OTHER PUBLICATIONS

International Search Report and Written Opinion dated Sep. 25, 2019, issued in corresponding International Application No. PCT/US2019/043081, filed Jul. 23, 2019, 13 pages.

* cited by examiner

*Primary Examiner* — Randall E Chin

(74) *Attorney, Agent, or Firm* — Christensen O'Connor Johnson Kindness PLLC

(57) ABSTRACT

Systems and methods for measuring and indicating brush head life are disclosed. In one embodiment, the system includes a brush head that moves with respect to a brush handle; an energy harvester that generates electrical signals based on movements of the brush head; a controller in electrical communication with the energy harvester; and an indicator in electrical communication with the controller. The indicator is energized based on a signal from the controller.

15 Claims, 6 Drawing Sheets

CROSS-SECTION A-A

SYSTEMS AND METHODS FOR MEASURING AND INDICATING BRUSH HEAD LIFE

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a face brush includes: a brush head configured to move with respect to a brush handle; an energy harvester configured to generate electrical signals based on movements of the brush head; a controller in electrical communication with the energy harvester; and an indicator in electrical communication with the controller. The indicator may be energized based on a signal from the controller. In one aspect, the movements of the brush head are oscillatory or rotational. In another aspect, the energy harvester is a piezo-element configured to oscillate when the brush head moves.

In one aspect, the energy harvester is carried by an adapter located between the brush head and the brush handle. In another aspect, the adapter is shaped as a disc, and the energy harvester is configured in a cavity of the adapter. In one aspect, the energy harvester is an electric generator.

In one aspect, the indicator is a light emitting diode (LED). In another aspect, the LED emits light through a lumen in the brush head. In one aspect, the LED emits light through light-channeling bristles of the brush head. In one aspect, the indicator is a source of sound, a haptic element, or a wireless transmitter.

In one aspect, comprising a capacitor electrically connected with the controller and the indicator. In another aspect, the controller charges the capacitor in response to the electrical signals received from the energy harvester. In one aspect, the controller is a counter configured to: count a number of the movements of the brush head; and energize the indicator when a predetermined count is reached.

In one embodiment, an adapter for a face brush includes: an energy harvester configured to generate electrical signals based on movements of a brush head; a controller in electrical communication with the energy harvester; and an indicator in electrical communication with the controller. In one aspect, the indicator is energized based on a signal from the controller, and the adapter is configured for a placement between the brush head and a brush handle.

In one aspect, the energy harvester is a piezo-element configured to oscillate when the brush head moves. In one aspect, the indicator is a light emitting diode (LED) configured to emit light through a lumen in the brush head or through light-channeling bristles of the brush head.

In one embodiment, a method for estimating a remaining useful life of a facial brush includes: generating electrical signals from movements of a brush head by an energy harvester; counting the movements of the brush head by a controller; and energizing an indicator when a predetermined count is reached. In one aspect, the energy harvester is a piezo-element configured to oscillate when the brush head moves. In another aspect, the energy harvester is an electric generator.

In one aspect, the indicator is a light emitting diode (LED) configured to light up, blink, or change color in response to a signal from the controller. In another aspect, the indicator is a source of sound, a haptic element, or a wireless transmitter.

In one aspect, the method includes: charging a capacitor in response to the electrical signals received from the energy harvester; and energizing the indicator at least in part by the capacitor. In another aspect, the method also includes: counting a number of the movements of the brush head by the controller; deciding that a predetermined number of the movements of the brush head is reached; and in response to reaching the predetermined number of the movements of the brush head, energizing the indicator.

DESCRIPTION OF THE DRAWINGS

The foregoing aspects and the attendant advantages of the inventive technology will become more readily appreciated as the same become better understood by reference to the following detailed description, when taken in conjunction with the accompanying drawings, wherein.

DETAILED DESCRIPTION

The following disclosure describes various embodiments of systems and associated methods for measuring and indicating brush head life. A person skilled in the relevant art will also understand that the technology may have additional embodiments, and that the technology may be practiced without several of the details of the embodiments described below with reference to FIGS. 1-5B.

Briefly described, systems and methods for measuring and indicating brush head life are described herein. In some embodiments, the inventive technology indicates the remaining useful life of a facial brush. The brush may include an energy harvester that generates electrical signals based on the rotation or oscillation of the brush head. Some examples of the energy harvesters are a piezo-element and an electric generator that are configured to generate signals as the brush head rotates or oscillates. In some embodiments, electrical signals generated by the energy harvester are tracked and counted by a counter (e.g., a controller, a processor or other integrated circuit). In different aspects, the indicator can be a source of light (e.g., a light emitting diode (LED)), a source of sound (e.g., a buzzer), a haptic element, or a wireless transmitter that sends a signal to a receiver. A predetermined threshold for the number of received signals may correspond to an end of life for the brush, a suggested replacement period, a suggested recharge time, etc. In some embodiments, when the signal count reaches the predetermined threshold, the counter sends a signal to an indicator.

In an embodiment of the inventive technology, the energy harvester is integrated into an adapter that can be used with the existing brush designs. In other embodiments, the energy harvester can be integrated with the brush head or the brush handle.

Figure 1:
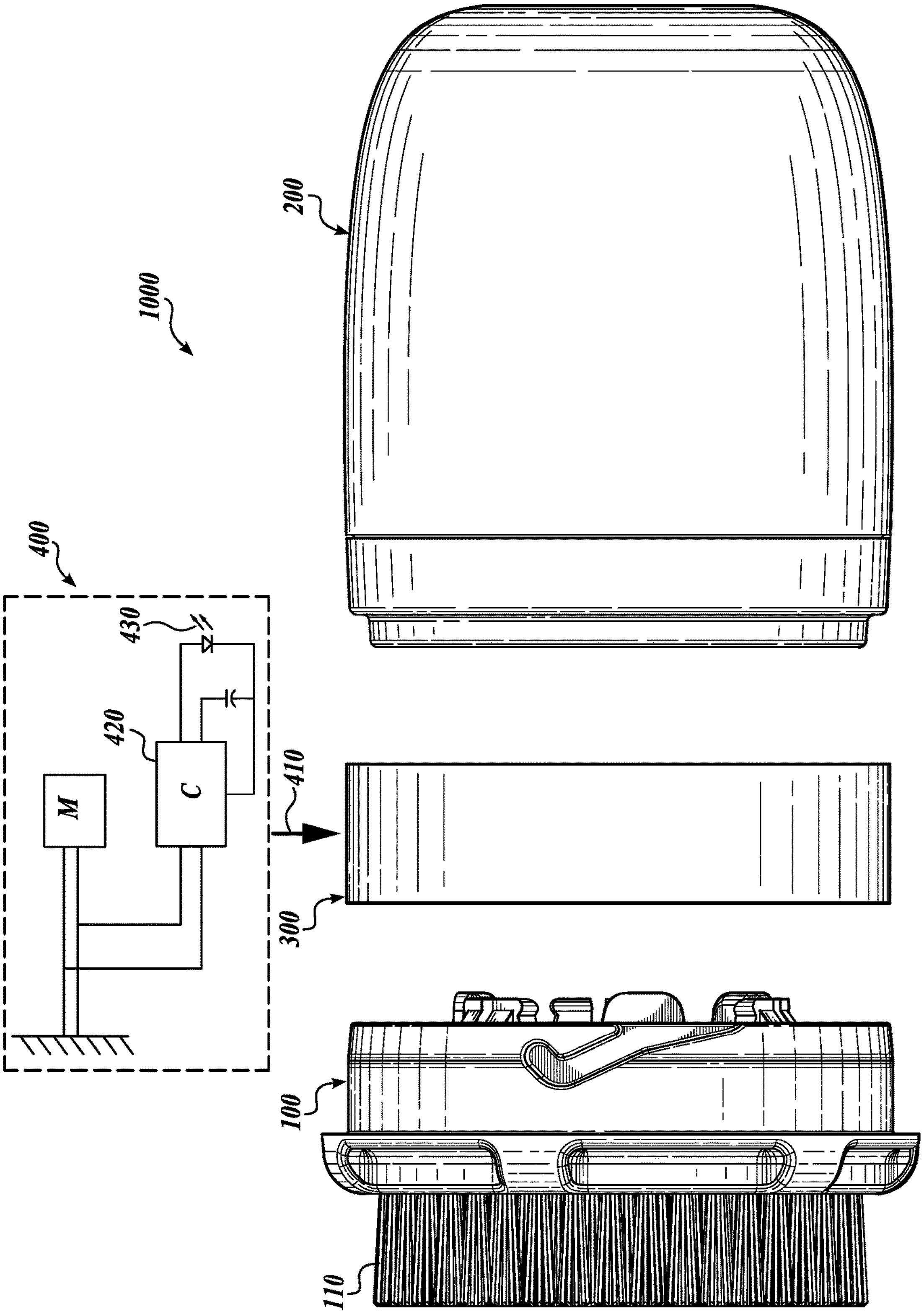
FIG. 1 is a partially schematic exploded view of a face brush in accordance with an embodiment of the present technology.

FIG. 1 is a partially schematic exploded view of a face brush 1000 in accordance with an embodiment of the present technology. In some embodiments, the face brush 1000 may be a combination of a conventional handle 200 and a brush head 100 with an adapter 300 inserted between the handle 200 and the brush head 100. In different embodiments, the adapter 300 may be shaped, for example, as a disc, a polygon or an ellipse. In some embodiments, the adapter 300 is made of plastic or other relatively light material. If used with the conventional face brush, the adapter may be an upgrade to the conventional face brush. In other embodiments, the energy harvester 400 may be integral with the brush head 100 (e.g., built into the brush head 100 at the time of manufacturing).

The adapter 300 may carry an energy harvester 400 (as indicated by arrow 410), which in operation produces pulses of energy based on oscillations or rotations of the brush head 100. Some non-exclusive examples of the energy harvesters are an oscillating piezo element and a miniature electrical generator that inductively couples coils with a magnetic field. The energy harvested off the oscillation or rotation of the brush head 100 may be metered by a controller 420 that energizes an indicator 430 after a prescribed number of oscillations of the brush head have been reached (e.g., after the threshold count has been reached). An embodiment of the indicator 430 is described below with respect to FIGS. 2 and 2A.

Figure 2:
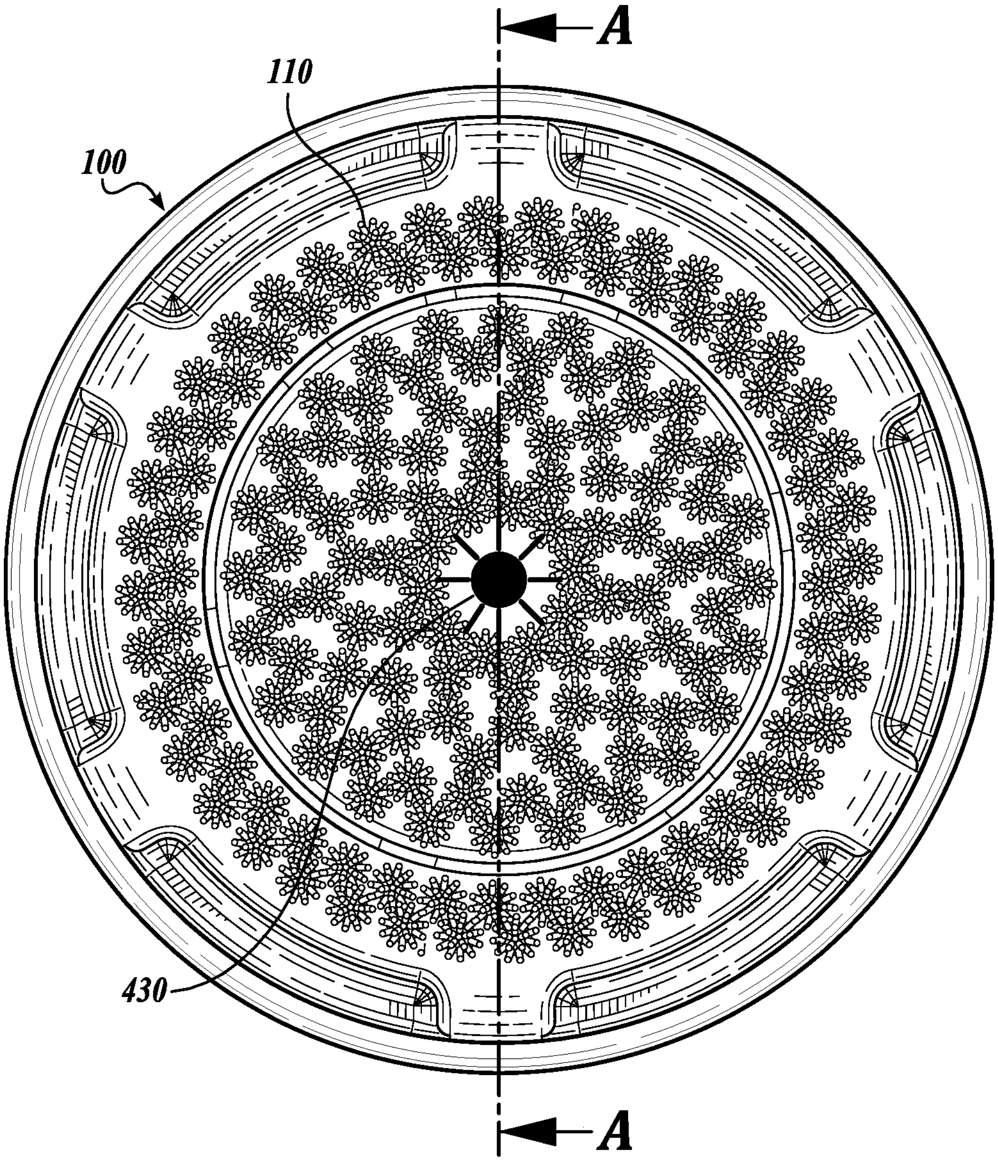
FIG. 2 is a side plan view of a face brush in accordance with an embodiment of the present technology.

FIG. 2 is a side plan view of a face brush in accordance with an embodiment of the present technology. In different embodiments, the indicator 430 may be a light emitting diode (LED), a source of sound (e.g., a miniature speaker), a haptic element, a wireless transmitter, or other indicator. In some embodiments, the indicator 430 is visible among bristles 110 as, for example, a blinking light, or a light that changes color as a function of the remaining life of the brush head 100. For example, the LED indicator 430 may be green for the brush head 100 that has significant remaining life, and red for the brush 100 that has little or no remaining life. In some embodiments, the indicator 430 is a wireless transmitter that sends an appropriate signal to a remote receiver. Such remote receiver may be placed on a recharging stand (not shown) of the face brush.

Figure 2A:
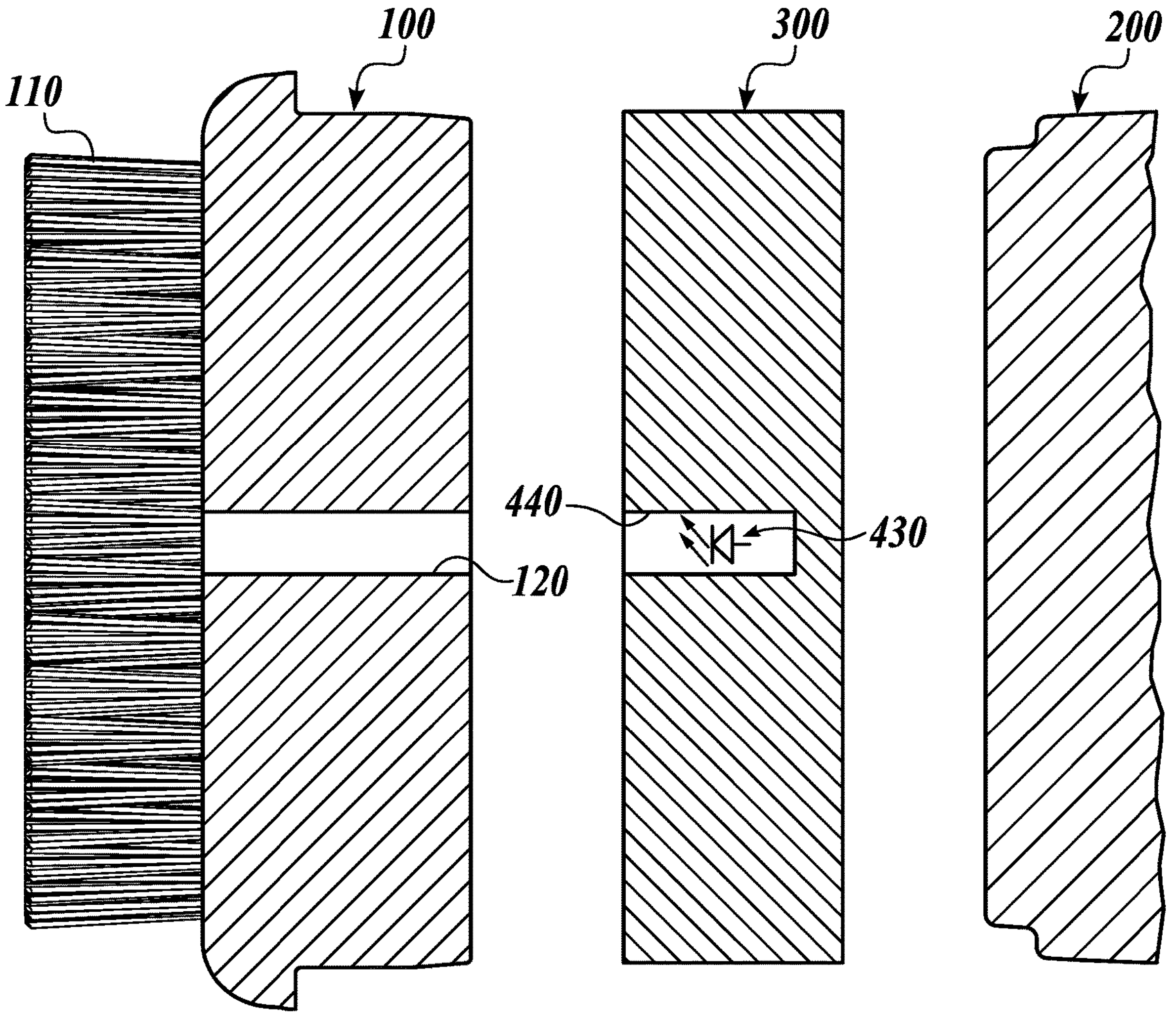
FIG. 2A is a cross-sectional view of the face brush shown in FIG. 2.

FIG. 2A is a cross-sectional view A-A of the face brush shown in FIG. 2. With the illustrated embodiment, the indicator 430 is an LED that emits light inside a cavity 440. The brush head 100 may have a corresponding lumen 120 for directing the light emitted by the indicator 430 out of the face brush. In some embodiments, some or all of the bristles 110 may be light-channeling bristles (e.g., optical fibers) therefore enhancing the visual indication of the remaining life of the face brush.

Figure 3:
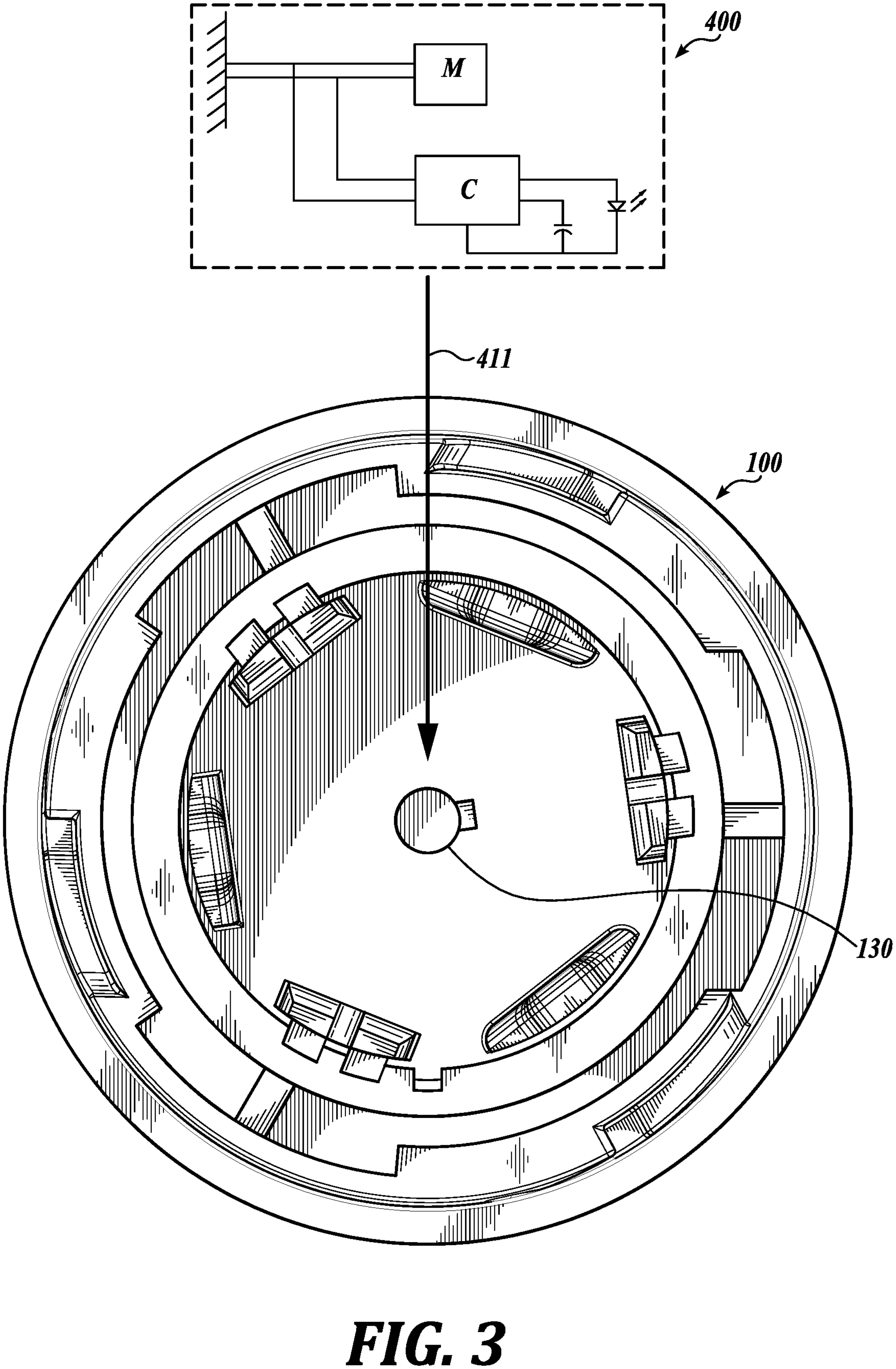
FIG. 3 is a schematic illustration of a placement of an energy harvester in accordance with an embodiment of the present technology.

FIG. 3 is a schematic illustration of a placement of the energy harvester 400 in accordance with an embodiment of the present technology. Placement of the energy harvester 400 is indicated by an arrow 411. In some embodiments, the energy harvester 400 is placed on the brush head 100. For example, the brush head 100 may include a cavity 130 that houses elements of the energy harvester 400. In the illustrated embodiment, the energy harvester 400 is sandwiched between the brush head 100 and the handle 200, therefore being protected from the moisture, dust, chemicals, etc.

Figure 4:
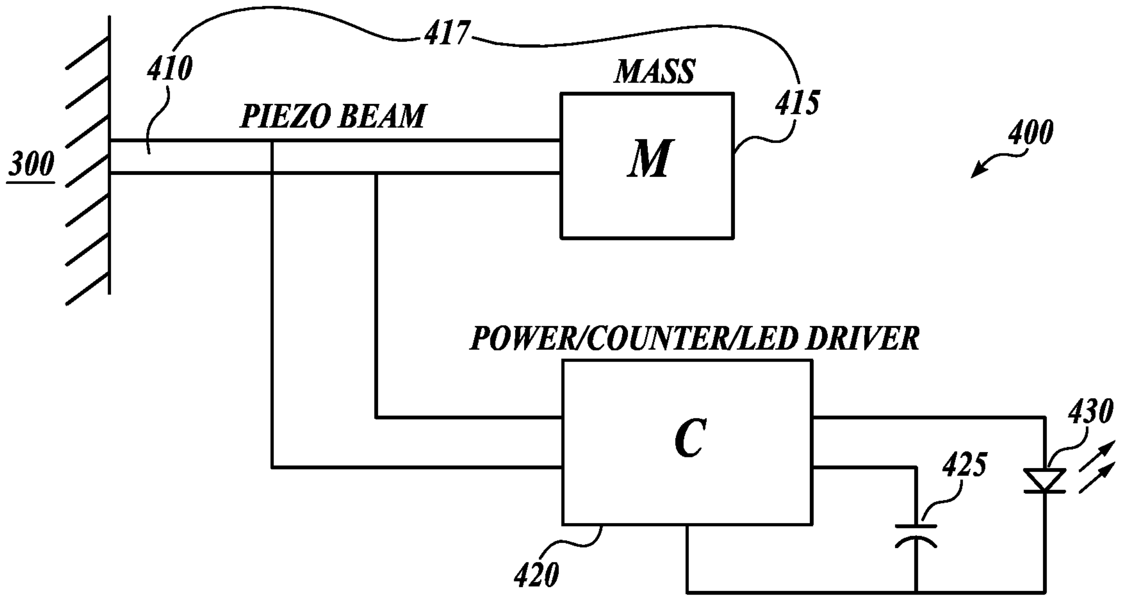
FIG. 4 is a schematic diagram of an energy harvester in accordance with the embodiments of the present technology.

FIG. 4 is a schematic diagram of the energy harvester 400 in accordance with the embodiments of the present technology. Illustrated energy harvester 400 includes a piezo element 417 carried by the adapter 300 or by the brush head. The piezo element 417 may have a piezo beam 410 that is attached to a moving (e.g., vibrating or rotating) surface of the brush on one side, and to an element 419 on its opposite side. In operation, the movement of the adapter 300 causes the element 419 (also referred to as a "mass") to oscillate, therefore bending the piezo beam up and down, and causing the opposite sides of the piezo beam 410 to compress and stretch. As one surface of the piezo beam 410 compresses and the opposite side stretches, these opposing surfaces generate different energy potential (voltage) that is supplied to a controller 420.

In some embodiments, the energy harvester 400 has a mm-scale, while the thickness of the piezo beam 410 is at a sub-mm scale. The resulting natural frequency of the piezo element 417 may be in the tens to hundreds Hz range. In many applications, the natural frequency of the piezo element 417 is tunable through the selection of the dimension and material of the piezo beam 410, and the magnitude of the mass 415. In some embodiments, these parameters are selected such that the natural frequency of the piezo element 417 corresponds to the frequency of vibration of the brush head.

In different embodiments, the controller 420 counts the number of the vibrations of the piezo element 417, determines a total time of operation for the piezo element, total idle time, or tracks other usage indicators of the face brush. The energy harvested off the piezo beam 410 may be partially stored in a capacitor 425 or other energy storage (e.g., a rechargeable battery).

The controller 420 may compare one or more usage indicators against predetermined threshold(s) to estimate the remaining life of the face brush. When a predetermined threshold is reached, the controller 420 may route the stored energy from the capacitor (or other energy storage) 425 to the indicator 430. In response, the indicator 430 emits signal (light, sound, wireless signal, etc.) to warn the user about the end of life for the face brush.

Figure 5A:
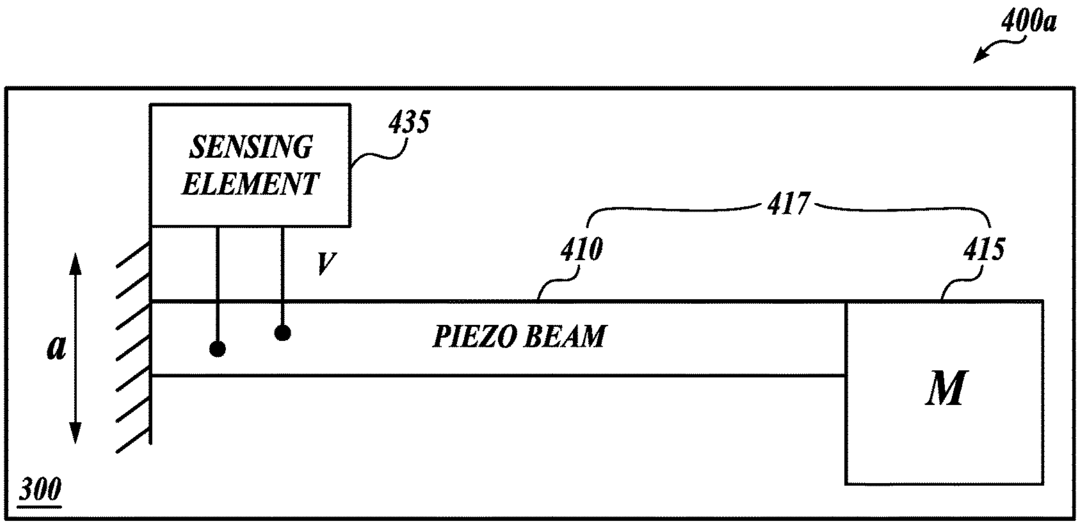
FIG. 5A is a schematic diagram of sensing output of an energy harvester in accordance with the embodiments of the present technology.

FIG. 5A is a schematic diagram of sensing output of an energy harvester 400*a* in accordance with the embodiments of the present technology. The energy harvester 400*a* includes the piezo element 417. As the brush head oscillates or rotates, the fixed side of the piezo beam 410 accelerates with acceleration "a," causing the piezo element 417 to oscillate. This oscillation produces a voltage differential across the piezo beam 410, which may be sensed by a sensing element 435. In some embodiments, the sensing element 435 is an analog to digital (A/D) converter connected to a suitable controller and memory storage. The sensing element 435 may be used to characterize operation of the piezo element 417. An example of such characterization is discussed with reference to FIG. 5B below.

Figure 5B:
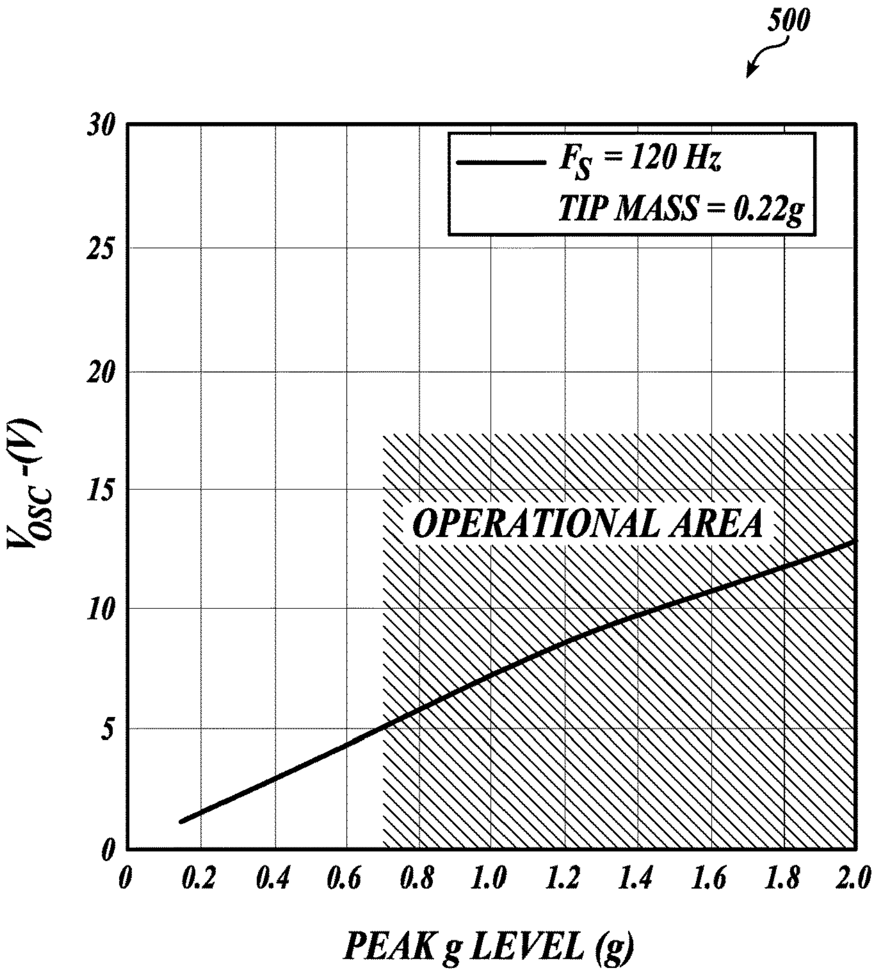
FIG. 5B is a graph of operating parameters of the energy harvester shown in Figure and noticed there are some problems I'm using

FIG. 5B is a graph 500 of operating parameters of the energy harvester shown in FIG. 5. The horizontal axis corresponds to the acceleration of the adapter 300 or the brush head 100 expressed as a multiple of the gravitational acceleration. The vertical axis corresponds to the voltage rise at the surface of the piezo beam 410 as the piezo element bends. The sample measurements were taken for the source of oscillation (e.g., the brush head) that oscillated at 120 Hz, and the mass 415 was 0.22 g. However, other values are possible depending on a target resonant frequency and desired energy output of the energy harvester 400.

The graph 500 shows that the voltage output, and hence the energy production, of the energy harvester 400 steadily increases with the peak acceleration of the brush head. The hatched area corresponds to the operational area of the energy harvester 400. The operational area may be defined as a set of conditions where the energy generated by the piezo element 417 sufficiently exceeds the energy consumption of the sensing element, the controller and/or other energy-consuming elements, including the internal losses, of the energy harvester 400. Therefore, when the energy harvester 400*a* oscillates within the operational area, sufficient energy is stored within a target time to activate the indicator 430 when needed. In the illustrated example, the operational area corresponds to the peak acceleration of about 0.7 g or higher, but other values are possible for different energy harvesters.

Many embodiments of the technology described above may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like).

From the foregoing, it will be appreciated that specific embodiments of the technology have been described herein for purposes of illustration, but that various modifications may be made without deviating from the disclosure. For example, in some embodiments the counter or controller may be based on a low-power buck regulator connected to a capacitor. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

We claim:

1. A face brush, comprising:

a brush head configured to move with respect to a brush handle;

an energy harvester configured to generate electrical signals based on movements of the brush head, wherein the energy harvester is carried by an adapter that is inserted between the brush head and the brush handle;

a controller in electrical communication with the energy harvester; and an indicator in electrical communication with the controller, wherein the indicator is energized based on a signal from the controller.

2. The face brush of claim 1, wherein the movements of the brush head are oscillatory or rotational.

3. The face brush of claim 1, wherein the energy harvester is a piezo-element configured to oscillate when the brush head moves.

4. The face brush of claim 1, wherein the adapter is shaped as a disc, and wherein the energy harvester is configured in a cavity of the adapter.

5. The face brush of claim 1, wherein the energy harvester is an electric generator.

6. The face brush of claim 1, wherein the indicator is a light emitting diode (LED).

7. The face brush of claim 6, wherein the LED emits light through a lumen in the brush head.

8. The face brush of claim 6, wherein the LED emits light through light-channeling bristles of the brush head.

9. The face brush of claim 1, wherein the indicator is a source of sound, a haptic element, or a wireless transmitter.

10. The face brush of claim 1, further comprising a capacitor electrically connected with the controller and the indicator.

11. The face brush of claim 10, wherein the controller charges the capacitor in response to the electrical signals received from the energy harvester.

12. The face brush of claim 1, wherein the controller is a counter configured to:

count a number of the movements of the brush head; and energize the indicator when a predetermined count is reached.

13. An adapter for a face brush, comprising:

an energy harvester configured to generate electrical signals based on movements of a brush head;

a controller in electrical communication with the energy harvester; and an indicator in electrical communication with the controller, wherein the indicator is energized based on a signal from the controller, and wherein the adapter is configured for a placement between the brush head and a brush handle.

14. The adapter of claim 13, wherein the energy harvester is a piezo-element configured to oscillate when the brush head moves.

15. The adapter of claim 13, wherein the indicator is a light emitting diode (LED) configured to emit light through a lumen in the brush head or through light-channeling bristles of the brush head.

* * * * *